(12) United States Patent
Omnes et al.

(10) Patent No.: US 10,660,112 B2
(45) Date of Patent: May 19, 2020

(54) TRANSMISSION RATE REGULATION METHOD

(71) Applicant: AVIWEST, Saint Gregoire (FR)

(72) Inventors: Yannick Omnes, Saint Gregoire (FR); Hamid Zakari, Saint Gregoire (FR); Ronan Poullaouec, Saint Gregoire (FR)

(73) Assignee: AVIWEST, Saint Gregoire (FR)

( * ) Notice: Subject to any disclaimer, the term of this patent is extended or adjusted under 35 U.S.C. 154(b) by 0 days.

(21) Appl. No.: 16/225,495

(22) Filed: Dec. 19, 2018

(65) Prior Publication Data
US 2019/0200368 A1 Jun. 27, 2019

(30) Foreign Application Priority Data

Dec. 22, 2017 (FR) ...................................... 17 62915

(51) Int. Cl.
*H04W 72/08* (2009.01)
*H04L 29/06* (2006.01)
*H04L 12/825* (2013.01)
*H04W 28/10* (2009.01)
*H04L 12/801* (2013.01)
*H04W 88/06* (2009.01)

(52) U.S. Cl.
CPC .......... *H04W 72/087* (2013.01); *H04L 47/263* (2013.01); *H04L 65/60* (2013.01); *H04W 28/10* (2013.01); *H04L 47/29* (2013.01); *H04W 88/06* (2013.01)

(58) Field of Classification Search
CPC .............................. H04W 72/087; H04L 65/60
See application file for complete search history.

(56) References Cited

U.S. PATENT DOCUMENTS

| | | | | |
|---|---|---|---|---|
| 7,512,108 B2 * | 3/2009 | Dispensa | .......... | H04W 72/1252 370/346 |
| 8,045,469 B2 * | 10/2011 | Nagy | .................... | H04W 28/22 370/235 |

(Continued)

OTHER PUBLICATIONS

Aug. 21, 2018 Search Report issued in French Patent Application No. 17/62915.

(Continued)

*Primary Examiner* — Rasheed Gidado
(74) *Attorney, Agent, or Firm* — Oliff PLC; R. Brian Drozd (57) ABSTRACT

A method regulates transmission rate during a transmission of audio/video data over a network link between a sender and a receiver. The method comprises a first mode not using any return information from the receiver, executed at the start of the transmission, where the only possible modification to the transmission rate by the sender is an increase, and at least one second mode implemented following the first mode using at least one item of return information from the receiver. A change from the first mode to a second mode takes place when return information indicates that the transmission rate has reached a maximum rate available on the network link. The transmission rate is shared between a useful-data rate budget comprising the audio/video data and a secondary-data rate budget not necessary for the decoding of the audio/video data. The secondary budget is used for exploring the capacities of a network link.

14 Claims, 6 Drawing Sheets

(56) References Cited

U.S. PATENT DOCUMENTS

| | | | | |
|---|---|---|---|---|
| 8,667,178 | B2* | 3/2014 | Kumagai | H04L 29/06476 |
| | | | | 709/246 |
| 8,804,803 | B2* | 8/2014 | Minoda | H04N 21/2402 |
| | | | | 375/226 |
| 9,201,812 | B2* | 12/2015 | Sashittal | G06F 13/00 |
| 9,860,605 | B2* | 1/2018 | Izvorski | H04N 21/64738 |
| 2003/0026207 | A1 | 2/2003 | Loguinov | |
| 2010/0110892 | A1* | 5/2010 | Lai | H04L 47/10 |
| | | | | 370/235 |

OTHER PUBLICATIONS

Matsufuji et al.; "Multipath TCP path schedulers for streaming video;" 2017 IEEE Pacific Rim Conference on Communications, Computers, and Signal Processing (PCRIM), IEEE, Aug. 21, 2017; pp. 1-6; XP033272965.

* cited by examiner

TRANSMISSION RATE REGULATION METHOD

The present invention relates to a method for regulating transmission rate between a sender and a receiver connected by a plurality of network links during a transmission of audio/video data, a device and a system implementing the method.

For some years, there has been an increase in applications using audio/video data transmissions over a wireless network. To the conventional transmissions of television programs on fixed devices such as television sets, there are added applications for audio/video transmission from or between mobile devices such as smartphones, tablets and drones.

It is usual for mobile devices to be suitable for using several types of wireless network. For example, a smartphone is suitable for using a mobile telephony network (such as a GSM (Global System for Mobile Communications) network, also referred to as a 2G network, a UMTS (Universal Mobile Communication System) network, also referred to as a 3G network, an LTE-Advanced (Long-Term Evolution Advanced) network, also referred to as a 4G network, or an LTE-Advanced Pro network, also referred to as a 5G network, etc., and a domestic network (such as for example an IEEE 802.11 network (ISO/IEC 8802-11), also referred to as a Wi-Fi network or a Bluetooth network). These mobile devices generally use only one of these wireless networks at a time, in general the network offering the best transmission performance.

A transmission of audio/video data over a wireless network link in general uses a transmission rate regulation method for estimating the performance in terms of bandwidth and latency of said link. This is because a device in principle has no idea about the performance of a wireless network link. The device must by itself discover what this performance is in order to transmit data with a rate matching this performance. The literature abounds in rate regulation methods for transmitting audio/video data over a network link. For these methods, reactivity properties are generally sought, making it possible to as quickly as possible adapt an audio/video transmission to the variations in performance of said link.

However, with the increase in quantities of data to be transmitted over wireless networks, due for example to the increase in resolutions of the audio/video images or to the need to transmit control data in the case of a drone, the use of a single wireless network link proves insufficient. This is why some mobile devices are suitable for communicating over a plurality of wireless network links in parallel (for example a plurality of 4G links, a plurality of 5G links, a combination of 4G, 5G and Wi-Fi links, etc.) in order to increase the transmission rate available.

However, communicating in parallel over a plurality of network links makes the transmission rate regulation problem much more complex. This is because the conventional rate regulation methods cannot be immediately transposed to the multilink case. These methods, although effective for regulating a transmission rate over a given link, do not respond to the question of the distribution of data over a plurality of links having independently varying performances.

It is desirable to overcome these drawbacks of the prior art. It is in particular desirable to find a transmission rate regulation method that is suited to the context of transmissions over a plurality of network links in parallel. It is also desirable for this method to be simple to implement and to have a low computing cost.

According to a first aspect of the present invention, the present invention relates to a method for regulating transmission rate during a transmission of audio/video data over a network link between a sender and a receiver, said method being implemented during receptions by the sender of information representing the transmission transmitted by the receiver. The method is implemented by the sender and comprises:

a plurality of transmission rate regulation modes comprising a first transmission rate regulation mode, executed at the start of the transmission, wherein the only possible modification to the transmission rate by the sender is an increase, in determining each rate increase value no account being taken of any information representing the transmission, and at least one second regulation mode implemented following the first mode, wherein at least one of the items of information representing the transmission is used to increase or decrease the transmission rate, a change from the first mode to a second mode taking place when one of the items of information representing the transmission indicates that the transmission rate has reached a maximum rate available on said network link; said transmission rate being shared between a useful-data rate budget comprising the audio/video data, referred to as the useful budget, and a secondary-data rate budget, referred to as the secondary budget, not necessary for the decoding of the audio/video data, only the secondary budget is increased during an increase in the transmission rate, the useful budget being increased only when no information representing the transmission received following an increase in the secondary budget indicates an increase in risk of data loss.

The use of a highly aggressive rate regulation mode at the start makes it possible to achieve an available rate on the network link more quickly. The use of a gentler rate regulation mode subsequently makes it possible to pursue the rate regulation while limiting the risks of data losses. Moreover, using secondary data for probing the available rate on the network makes it possible to limit an impact that data losses would have on the audio/video data.

According to one embodiment, in the first mode, when at least one of the items of information representing the transmission indicates that an increase in a useful budget is possible, the method comprises: increasing the useful budget by a second predefined percentage of the secondary budget when a rate of transmission by the sender of secondary data is lower than a first predefined percentage of the rate of transmission by the sender of the useful data, and decreasing the secondary budget by the value of the increase in the useful budget; increasing the useful budget by fixing the value of the useful budget at the sum of the secondary budget and a value representing a rate of reception by the receiver of the useful and secondary data transmitted by the sender.

According to one embodiment, in the first mode, when at least one of the items of information representing the transmission indicates that an increase in a secondary budget must be applied, the method comprises: increasing the secondary budget by a first predefined increase value.

According to one embodiment, in a second mode, where at least one of the items of information representing the transmission indicates that an increase in the useful budget is possible, the method comprises: when one of the items of information representing the transmission indicates that a reception rate of the receiver reaches a third predefined percentage of the maximum rate available on the network, allocating respectively to the useful budget and to the secondary budget predefined fourth and fifth percentages of the reception rate, a sum of the useful budget and secondary budget being equal to said reception rate, the useful budget being greater than the secondary budget; when one of the items of information representing the transmission indicates that said reception rate is lower than the third predefined percentage of the maximum rate available on the network, setting the secondary budget to zero, allocating to the useful budget a sixth predefined percentage of said maximum and decreasing said maximum by a seventh predefined percentage.

According to one embodiment, in a second mode, when at least one of the items of information representing the transmission indicates that an increase in the secondary budget must be applied, the method comprises: calculating an increase value by multiplying a second predefined increase value lower than the first predefined increase value by a coefficient lying between zero and unity, said coefficient being calculated from an item of information representing a congestion window and information dependent on one-way times observed by the receiver and transmitted in the information representing the transmission to the sender; and increasing the useful budget by the calculated increase value.

According to one embodiment, when at least one of the items of information representing the transmission indicates that no increase in the transmission rate is possible, the method comprises: applying a procedure for checking the packet loss rate and reducing the transmission rate if the loss rate is higher than a predefined loss threshold; if the loss rate is lower than the predefined loss threshold, applying a procedure for checking the one-way delay and reducing the transmission rate when a difference between the one-way delay and a reference one-way delay value is greater than a predefined difference.

According to a second aspect of the invention, the invention relates to a method for regulating transmission rate between a sender and receiver connected by a plurality of network links during transmission of audio/video data. The method comprises: forming a list of ordered links; running through the links in the order of the list; for each link: defining a budget for data to be transmitted by said link, referred to as a current link, using information supplied for the current link by the rate regulation method according to the first aspect; and transmitting a quantity of data corresponding to said budget; passing to the next link when the quantity of data corresponding to said budget has been transmitted, resuming the list at the start when all the links in the list have been run through.

Thus a plurality of links are used in parallel, each link being used according to the capacities thereof.

According to one embodiment, the list is ordered in accordance with a performance metric calculated for each link in the plurality of links, for a link, said metric being an increasing function of the budget for data to be transmitted by said link, a decreasing function of an item of information representing a packet loss rate on said link, and an increasing function of a difference between a congestion window size of the links and an item of information representing a one-way time measured for said link.

According to one embodiment, the performance metric for a network link i in the plurality of links is calculated as follows:

$$Q_i = \frac{(B\_data_i + B\_sec_i)^2}{(P_c^i)^2 \times TD} \times \left(\frac{timewindow}{3} - owd_i\right)$$

where $B_{data_i}$ is the useful budget for the network link i, $B_{sec_i}$ is the secondary budget for the network link i, the sum of said useful budget and said secondary budget being the budget for data to be transmitted by the network link i, $P_c^i$ is information representing a packet loss rate for the network link i, TD is a secondary budget sum for all the network links in said plurality, $owd_i$ is the information representing a one-way delay measured for the network link i, and timewindow is a latency that the system consisting of the drone 1 and the control system 3 must comply with. In other words, a timewindow delay must elapse between the moment when a data packet enters the system (i.e. for example the moment when the packet is generated by the drone 1) and the moment when it leaves it (i.e. for example the moment when the packet is consumed by the control system 3). It should be noted that a clock synchronisation mechanism is used between the drone 1 and the control system 3 so that the latency can be controlled effectively. Timewindow is a predefined value fixed by a user of the system consisting of the drone 1 and the control system 3. For example, when a user wishes to implement a duplex, he chooses a low value of timewindow (for example 100 milliseconds). On the other hand, if the user wishes to implement an audio/video data transmission in a single direction without any time constraint on the display of said data, he chooses a high timewindow value (for example 400 milliseconds).

According to one embodiment, when the sender is without any data to be transmitted after a transmission of a packet, the next link used for transmitting a packet is the first in the list, the list then being run through starting from the first link in the list.

Thus the most efficient network links are privileged.

According to a third aspect of the invention, the invention relates to a device for regulating transmission rate during a transmission of audio/video data over a network link between a sender and a receiver, the device comprising means suitable for implementing the method according to the first aspect.

According to a fourth aspect of the invention, the invention relates to a device for regulating transmission rate between a sender and a receiver connected by a plurality of network links during an audio/video data transmission, comprising means suitable for implementing the method according to the second aspect.

According to a fifth aspect of the invention, the invention relates to a system for transmitting audio/video data, comprising a sender comprising a device according to the third or fourth aspect and a receiver, the sender and the receiver being connected by at least one network link.

According to a sixth aspect, the invention relates to a computer program comprising instructions for the implementation, by a device, of the method according to the first aspect or the method according to the second aspect, when said program is executed by a processor of said device.

According to a seventh aspect, the invention relates to storage means storing a computer program comprising instructions for the implementation, by a device, of the method according to the first aspect or the method according to the second aspect, when said program is executed by a processor of said device.

The features of the invention mentioned above, as well as others, will emerge more clearly from a reading of the following description of an example embodiment, said description being given in relation to the accompanying drawings, among which.

Hereinafter the invention is described in a context of a drone system in which an operator controls a drone from a control system and the drone is suitable for acquiring audio/video data and transmitting them to the control system, on which they are displayed. In this system, the communications are bidirectional since at least audio/video data are transmitted from the drone to the control system and at least control data are transmitted from the control system to the drone. Moreover, these communications use multiple wireless network links.

The invention is however suited to other contexts, in particular to the case of a system comprising two mobile devices fulfilling alternately a role of sender and receiver, each mobile device being able to acquire audio/video data and to transmit them to the other device using a plurality of network links in parallel. In this case, the two mobile devices could for example be smartphones.

Moreover, the invention is suited to systems where only audio data or only video data are exchanged. In this case, although hereinafter audio/video data are spoken of, this could contain only audio data or only video data.

Figure 1:
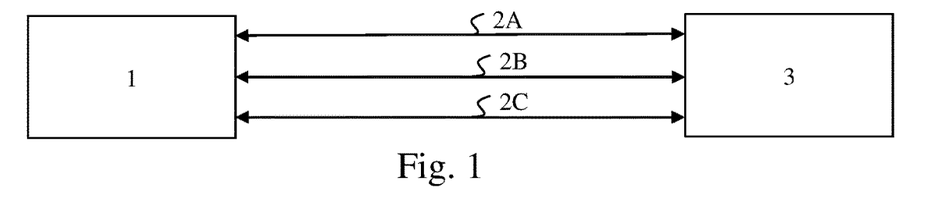
FIG. 1 illustrates schematically an example of an audio/video transmission system using a plurality of network links.

FIG. 1 illustrates schematically an example of an audio/video transmission system using a plurality of network links.

This system comprises a system 1 and a system 3 connected by a plurality of network links 2A, 2B and 2C. The system 3 is a control system enabling an operator to control the system 1, which is a drone.

Figure 2:
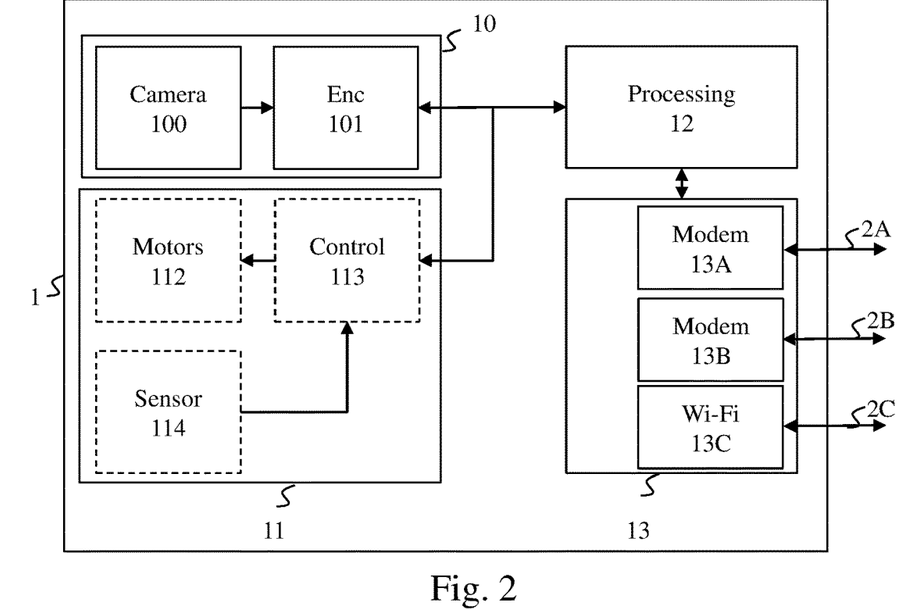
FIG. 2 illustrates schematically an example of a drone used in the audio/video transmission system.

The plurality of network links 2A, 2B and 2C comprise at least one 4G or 5G link, at least one Wi-Fi link and, in some embodiments, at least one satellite link. In this way, the system 1 and the system 3 can communicate at a short distance using a Wi-Fi link and, beyond the range of the Wi-Fi link, using a 4G or 5G link. FIG. 2 illustrates schematically an example of a drone used in the audio/video transmission system.

The drone 1 comprises the control module 11, an acquisition module 10, a processing module 12 and a network module 13.

The acquisition module 10 comprises a camera 100 suitable for acquiring images in the environment of the drone 1. The camera 100 supplies the images acquired to an audio/video encoder 101, which compresses the video images in a format such as the AVC (Advanced Video Coding) format (UIT-T H.264-ISO/IEC MPEG-4 Part 10 (ISO/IEC 14496-10)) or the HEVC (High Efficiency Video Coding) format (UIT-T H.265-ISO/IEC 23008-2)). The camera 100 also comprises an audio sensor, which captures audio data and supplies them to the audio/video encoder 101, which compresses them for example to the AAC (Advanced Audio Coding) format. The compressed audio/video data are next inserted in a transport stream by the audio/video encoder 101, such as for example an MPEG-TS stream (Moving Picture Expert Group-Transport Stream). The audio/video encoder 101 encapsulates the transport stream in packets such as RTP (Real-Time Transport Protocol) packets (RFC 3550), the audio data and the video data being encapsulated in different packets. Then an audio/video stream is obtained, encapsulated in packets output from the control and acquisition module 10.

When the system 1 is a drone, this comprises a control module 11, comprising motors 112, a movement controller 113 and at least one sensor 114, such as a gyroscope. The movement controller 113 receives control signals coming from the control system 3, and information from each sensor 114, and acts on the motors 112 in order to move the drone taking into account these control signals and information. When the movement controller 113 receives no control signal, in the case of a network break for example, it acts on the motors 112 in order to stabilise the drone in a current position while awaiting new control signals.

The network module 13 comprises a communication module 13A, 13B and 13C corresponding respectively to the network links 2A, 2B and 2C. The communication module 13A is for example a first 5G module. The communication module 13B is for example a second 5G module. The communication module 13C is for example a Wi-Fi module.

The processing module 12 is a central element of the drone 1. This is because the processing module 12 receives statistical information on the state of each network link 2A, 2B and 2C, referred to as information representing the transmission, coming from the network module 13, and uses it to implement a transmission rate regulation method according to the invention. The information representing the transmission comprises in particular, for each network link, a one-way delay (OWD) time, information representing the last packet acknowledged, information representing a loss rate on the link, and information representing the total number of bytes received. The processing module 12 determines in particular a rate constraint to be allocated to the audio/video encoder 101. Moreover, the processing module 12 receives the audio/video data packets produced by the audio/video encoder 101 and is responsible for distributing these packets over the communication modules 13A, 13B and 13C, taking account of the results of the rate regulation method. The processing module 12 also receives packets comprising control signals coming from the control system 3, extracts these control signals from the packets and transmits the control signals to the control module 11.

In one embodiment, the network module 13 comprises more than three communication modules.

In one embodiment, the processing module 12 implements a forward error control (FEC) module, not shown. The forward error control module processes each type of data independently. The forward error control module calculates redundant data, for example in the form of an error correcting code, independently for the video data, for the audio data and for all other data passing between the drone 1 and the control system 3. These redundant data are transmitted in the form of packets and can be used by the control system 3 for repairing useful data packets lost during transmission.

In one embodiment, the processing module 12 implements a lost packet retransmission module. The lost packet retransmission module manages each type of data independently. When the statistics received from the control system 3 indicate that one or more packets have been lost, the retransmission module retransmits the lost packets at least once.

In one embodiment, the processing module 12 implements a forward error control module and a retransmission module. However, these modules are not activated at the same time. The retransmission module of a communication module is activated when an average latency between the drone 2 and the control system 3 is below a predetermined threshold. In this case, the forward error control module is deactivated. When the average latency exceeds said predetermined threshold, the forward error control module is activated and the retransmission module is deactivated. The predetermined threshold is for example equal to a latency of 100 ms.

In one embodiment, the processing module 12 also uses information from the audio/video encoder 101 to implement the transmission rate regulation method according to the invention. For example, the processing module 12 uses information representing a state of an output memory (buffer) of the audio/video encoder 101.

Figure 3:
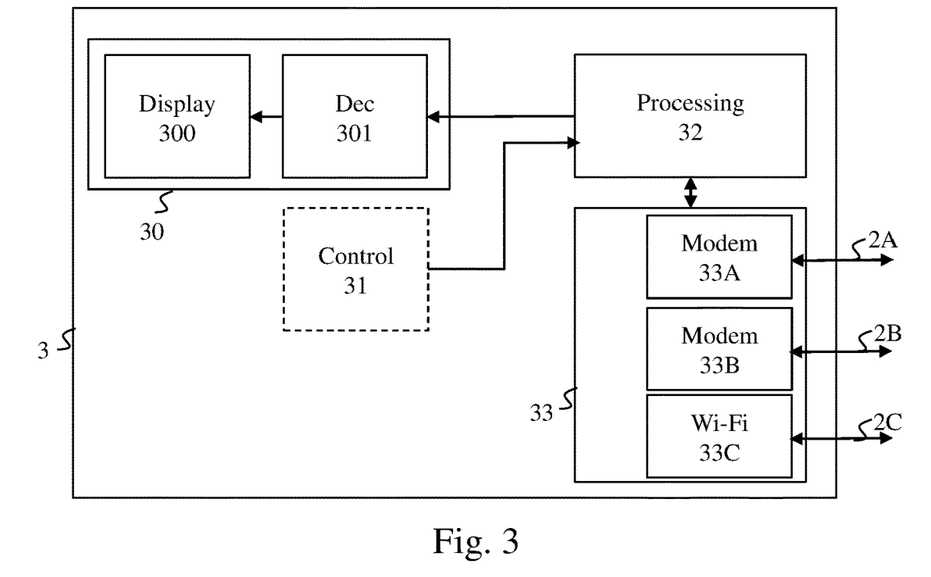
FIG. 3 illustrates schematically an example of a control system used in the audio/video system.

FIG. 3 illustrates schematically an example of a control system used in the audio/video system.

The control system 3 comprises a multimedia module 30, a control module 31, a processing module 32 and a network module 33. The multimedia module 30 comprises a module 300 (such as a screen) for displaying and broadcasting audio data (such as at least one loudspeaker). The module 300 receives the decoded audio/video data from a decoding module 301.

When the system 1 is a drone, the control system 3 comprises a control module 31. The control module 31 receives the commands from an operator obtained by means of a man-machine interface such as joysticks, buttons or voice commands and translates them into control signals.

The network module 33 comprises a communication module 33A, 33B and 33C corresponding respectively to the network links 2A, 2B and 2C. The communication module 33A is for example a first 5G module. The communication module 33B is for example a second 5G module. The communication module 33C is for example a Wi-Fi module.

The processing module 32 receives the audio/video data in the form of packets coming from the network module, re-orders these packets and transmits the re-ordered packets to the audio/video decoding module 301.

Moreover, the processing module 32 receives the control signals produced by the control module 31, inserts them in packets and is responsible for distributing the packets obtained over the communication modules 33A, 33B and 33C.

The processing module 32 further receives statistics on the state of each network link 2A, 2B and 2C from the network module 33, puts this information in the form of information representing the transmission and inserts this information in packets so that it is transmitted to the drone 1. In one embodiment, the processing module 32 uses the two network links offering the best performance to transmit the information representing the transmission. Each packet containing information representing the transmission is therefore transmitted firstly over the network link offering the best transmission performance and in parallel secondly over the link offering the second best transmission performance.

In one embodiment, when the processing module 12 of the drone 1 implements a forward error control module, the processing module 32 implements a symmetrical module capable of decoding the redundant data if necessary.

In one embodiment, when the processing module 12 of the drone 1 implements a retransmission module, the processing module 32 implements a symmetrical module capable of requesting retransmissions of lost packets.

In one embodiment, the processing module 32 recovers information representing the state of the audio/video decoder 301 and retransmits it in the form of packets to the drone 1. For example, the processing module 32 recovers the state of an input memory of the decoding module 301 and transmits information representing this state to the drone 1. The state of the input memory of the drone can be used by the processing module 12 of the drone 1 to refine its transmission rate regulation.

In one embodiment, the network module 33 comprises more than three communication modules.

As seen above, the drone 1 and the control system 3 communicate using packets. Each packet exchanged comprises a global header, described in table 1 below, the syntax and semantics of which are the same whatever the data transported by the packet. A field "Packet ID" describes the content of the packet, i.e. describes whether the packet contains a command or audio/video data. A field "Packet type" describes whether the packet is a request or a response to a request. A packet containing audio/video data is for example considered to be a request. An acknowledgement packet is considered to be a response to a request.

TABLE 1

| Global header | | |
| --- | --- | --- |
| Field | Size (in bits) | Semantics |
| Packet ID | 4 | Describes the content of the packet (commands, data) |
| Packet type | 1 | Describes whether the packet is a request or a response to a request |
| Packet seqnum | 11 | Packet sequence number |

Following the global header, each packet comprises a header dependent on the data transported by the packet. When the packet comprises audio/video data or data assimilated to audio/video data, which are referred to hereinafter as secondary data, the packet comprises a header, referred to as the data packet header, described by table 2.

TABLE 2

Data packet header

| Field | Size (in bits) | Semantics |
| --- | --- | --- |
| Stream Id | 4 | Identifier of the data stream to which the packet belongs |
| retransmission | 1 | Equal to "1" for a retransmission packet or a secondary packet |
| Reserved | 3 | Reserved for future use |
| seqnum | 32 | Global sequence number |
| Data timestamp | 32 | Time indicator of transported data |
| Packet timestamp | 16 | Time indicator of sending a packet |
| Link seqnum | 16 | Sequence number of link used |
| Data size | 16 | Size of useful data contained in the packet |
| FEC | 16 | Information concerning the forward error control data |

The data packet header comprises:
a "stream ID" field identifying the data stream to which the packet belongs;
a "retransmission" field equal to "1" for a retransmission packet or a secondary data packet, "0" otherwise;
a "reserved" field reserved for future use;
a "seqnum" comprising a sequence number of the data packet;
a "data timestamp" field comprising a time indicator for the data transported by the data packet;
a "packet timestamp" field comprising a packet sending time indicator (i.e. time of sending the packet);
a "link seqnum" field comprising a sequence number of the link used;
a "data size" field giving the size in bytes of the data contained in the packet;
an "FEC" field giving information on the method used to generate forward error control data.

When the packet comprises commands for controlling the drone 1, the global header is followed by a command packet header shown in table 3.

TABLE 3

Command packet header

| Field | Size (in bits) | Semantics |
| --- | --- | --- |
| Command type | 8 | Type of command |
| Counter | 32 | Number of command |
| Retry | 8 | Used for acknowledgements |
| Timestamp | 32 | Time indicator, for managing command expiries |

The command packet header comprises:
a "command type" field describing the type of command (for example forward, backward, to the left, to the right, etc.);
a "counter" field indicating a command number;
a "retry" field used during acknowledgements;
a "timestamp" field corresponding to a time indicator for sending of the command. This indicator is used for example to determine whether a command has arrived too late and that it must not be considered by the drone.

When the packet comprises information representing the transmission, the global header is followed by an information packet header representing the transmission described in table 4.

TABLE 4

Information packet header representing the transmission

| Field | Size (in bits) | Semantics |
| --- | --- | --- |
| Links connected | 8 | Number of links connected |
| Link index | 8 | Index of link for which the following statistics are sent |
| OWD | 16 | One-way delay |
| Ack end seq | 16 | Last packet acknowledged |
| Total link loss | 16 | Number of packets lost on the link |
| Total link received bytes | 32 | Bytes received on the link |
| Link index | 8 | Index of the link for which the following statistics are sent |
| OWD | 16 | One-way delay |
| Ack end seq | 16 | Last packet acknowledged |
| Total link loss | 16 | Number of packets lost on the link |
| Total link received bytes | 32 | Bytes received on the link |

The information packet header representing the transmission comprises statistics on a plurality of links. As seen above, this type of package is transmitted on the best two network links in the plurality of links. More precisely, the information packet header representing the transmission comprises:
a "link connected" field indicating the number of links between the drone 1 and the control system 3 and therefore the number of links for which statistics are transmitted in the packet of information representing the transmission;
at least one "link index" field giving an index of the link for which the following statistics are sent, i.e. index of the link to which the following four fields of the packet relate;
at least one "OWD" field transporting information representing a one-way delay between the drone and the control system for the link of index "link index" calculated by the processing module 32;
at least one "Ack end seq" field transporting information representing the last packet acknowledged by the processing module 32 for the link of index "link index";
at least one "total link loss" field transporting information representing the number of packets lost on the link of index "link index";
at least one "total link received bytes" field transporting information representing a quantity of bytes received over the link of index "link index".

Figure 4A:
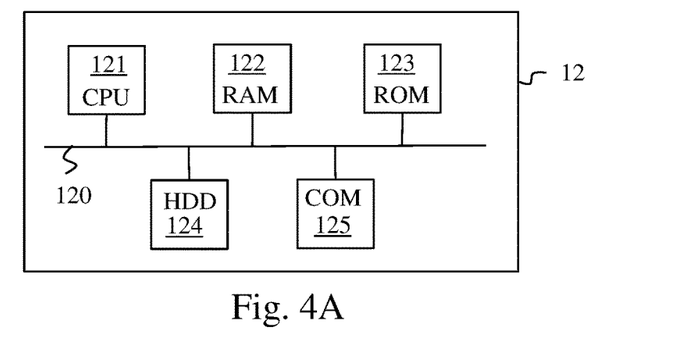
FIG. 4A illustrates schematically an example of hardware architecture of a processing module of a sender according to the invention.

FIG. 4A illustrates schematically an example of hardware architecture of the processing module 12. The processing module 12 then comprises, connected by a communication bus 120: a processor or CPU (central processing unit) 121; a random access memory (RAM) 122; a read only memory (ROM) 123; a storage unit or a storage medium reader, such as an SD (secure digital) card reader 124; and a set of communication interfaces 125 enabling the processing module 120 to communicate with the other modules included in the drone 1.

The processor 121 is capable of executing instructions loaded into the RAM 122 from the ROM 123, from an external memory (not shown), from a storage medium, such as an SD card, or a network link. When the processing module 120 is powered up, the processor 121 is capable of reading instructions from the RAM 122 and executing them. These instructions form a computer program causing the implementation, by the processor 121, of the method described in relation to FIGS. 5 to 11.

All or some of the methods described in relation to FIGS. 5 to 11 may be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

Figure 4B:
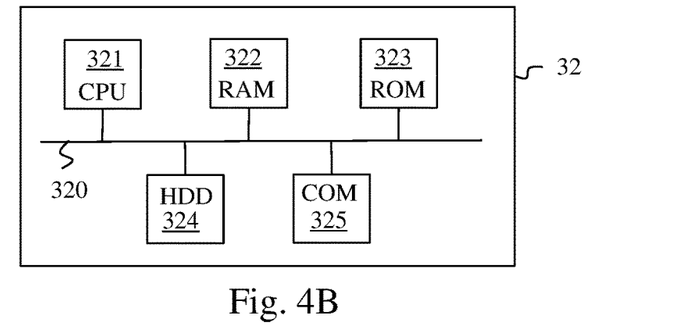
FIG. 4B illustrates schematically an example of hardware architecture of a processing module of a receiver according to the invention.

FIG. 4B illustrates schematically an example of hardware architecture of the processing module 32. The processing module 32 then comprises, connected by a communication bus 320; a processor or CPU 321; a random access memory RAM 322, a read only memory ROM 323, a storage unit or a storage medium reader, such as an SD card reader 324; and a set of communication interfaces 325 enabling the processing module 320 to communicate with the other modules included in the control system 3.

The processor 321 is capable of executing instructions loaded in the RAM 322 from the ROM 323, from an external memory (not shown), from a storage medium such as an SD card, or from a network link. When the processing module 320 is powered up, the processor 321 is capable of reading instructions from the RAM 322 and executing them. These instructions form a computer program causing the implementation, by the processor 321, of steps of re-forming the audio/video stream from packets containing the audio/video data, steps of formation of packets containing the control signals, and steps of recovery of statistics from the network links and insertion of information representing the transmission obtained from these statistics in packets.

All or some of the steps executed by the processing module 32 may be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

Hereinafter, we describe the transmission rate regulation method according to the invention. This method comprises, for each link in a plurality of links, an execution of a link rate regulation method for determining a rate to be transmitted over said link and for the plurality of links, and an execution of a global rate regulation method for distributing data over a plurality of network links. The link rate regulation method and the global rate regulation method are executed in parallel, the global rate regulation method using information supplied by the link rate regulation method in the course of the execution thereof.

Figure 5:
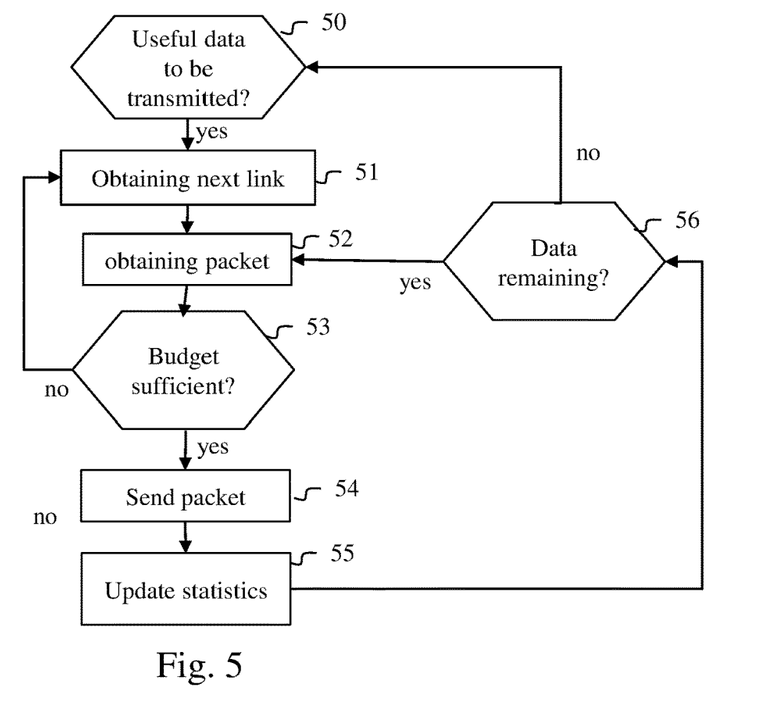
FIG. 5 illustrates schematically a global rate regulation method according to the invention allowing a distribution of data over a plurality of network links.

The link rate regulation method is described in relation to FIGS. 6 to 11 and the global rate regulation method is described in relation to FIG. 5.

The link rate regulation method is implemented by a sending device. In the context of the example described in relation to FIG. 1, it is therefore implemented by the drone 1 and more precisely by the processing module 12. As seen above, the processing module 12 executes the link rate regulation method for each network link 2A, 2B and 2C. An instance of the link rate regulation method is therefore associated with each network link 2A, 2B and 2C.

The link rate regulation method comprises a plurality of rate regulation modes.

Figure 6:
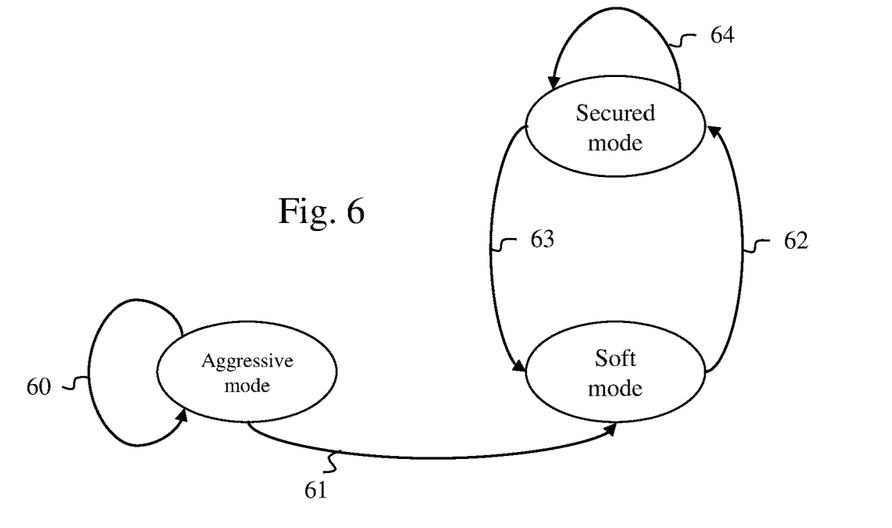
FIG. 6 illustrates schematically a plurality of rate regulation modes used in a link rate regulation method.

FIG. 6 illustrates schematically a plurality of rate regulation modes used in the link rate regulation method according to the invention.

The plurality of link rate regulation modes comprises a first rate regulation mode, referred to as aggressive mode, executed at the start of the transmission. In aggressive mode the only possible modification of the transmission rate is an increase. In determining each rate increase value, no information representing the transmission is taken into account. For a network link, referred to as current link, the aggressive mode is used to enable the drone to quickly reach a maximum rate available on the current link.

The plurality of rate regulation modes comprise at least one second regulation mode implemented following the aggressive mode, in which at least one item of information representing the transmission on the current link is used to increase or decrease the transmission rate.

In aggressive mode, the processing module 12 loops back onto a rate increase step 60 as long as the transmission rate of the drone 1 has not reached a maximum rate available on the current link. In a step 61, the processing module changes from aggressive mode to a second mode when at least one item of information representing the transmission on the current link indicates that the transmission rate has reached the maximum rate available on the current link. The information representing the transmission is for example a packet loss rate or a one-way delay (OWD). When the packet loss rate (when there is a difference between the last measured one-way delay owd and a minimum one-way delay min_OWD) exceeds a predetermined change threshold (or respectively a predetermined difference), the processing module 12 passes to a second mode. The predetermined change threshold is for example 1% of packet losses. The predetermined difference is for example equal to 2×min_OWD, which is equivalent to having a one-way delay three times greater than the minimum one-way delay min_OWD.

Once the processing module has passed into a second regulation mode, it never returns to aggressive mode.

In one embodiment, the plurality of rate regulation modes comprise two second modes, a first second mode, referred to as gentle mode, and a second second mode, referred to as secure mode.

During step 61, the processing module 12 passes from aggressive mode to gentle mode. In gentle mode, the processing module continues to explore the current link by increasing the transmission rate but, this time, more gradually. To do this, as we shall see in relation to FIG. 9, the processing module 12 uses lower rate increase values than in aggressive mode.

As soon as the successive rate increases made in gentle mode cause packet losses, or an increase in the one-way delay, or as soon as the rate increase value is below a predetermined low increase threshold, the processing module 12 passes to secure mode during a step 62.

In secure mode, the processing module 12 reduces the transmission rate as soon as excessively high packet losses or one-way times are noted. When the reduction in the transmission rate has made it possible to prevent packet losses and the one-way time has returned to an acceptable level, the processing module 12 determines a rate increase value and applies the determined increase to the transmission rate on the current link. If the rate increase value is higher than the predetermined low increase threshold, the processing module returns to gentle mode in step 63. Otherwise the processing module 12 loops back in secure mode during a step 64. In this way, the increase values in secure mode are lower than in gentle mode. There are therefore fewer risks of causing packet losses or increases in one-way delays in secure mode than in gentle mode.

Figure 7:
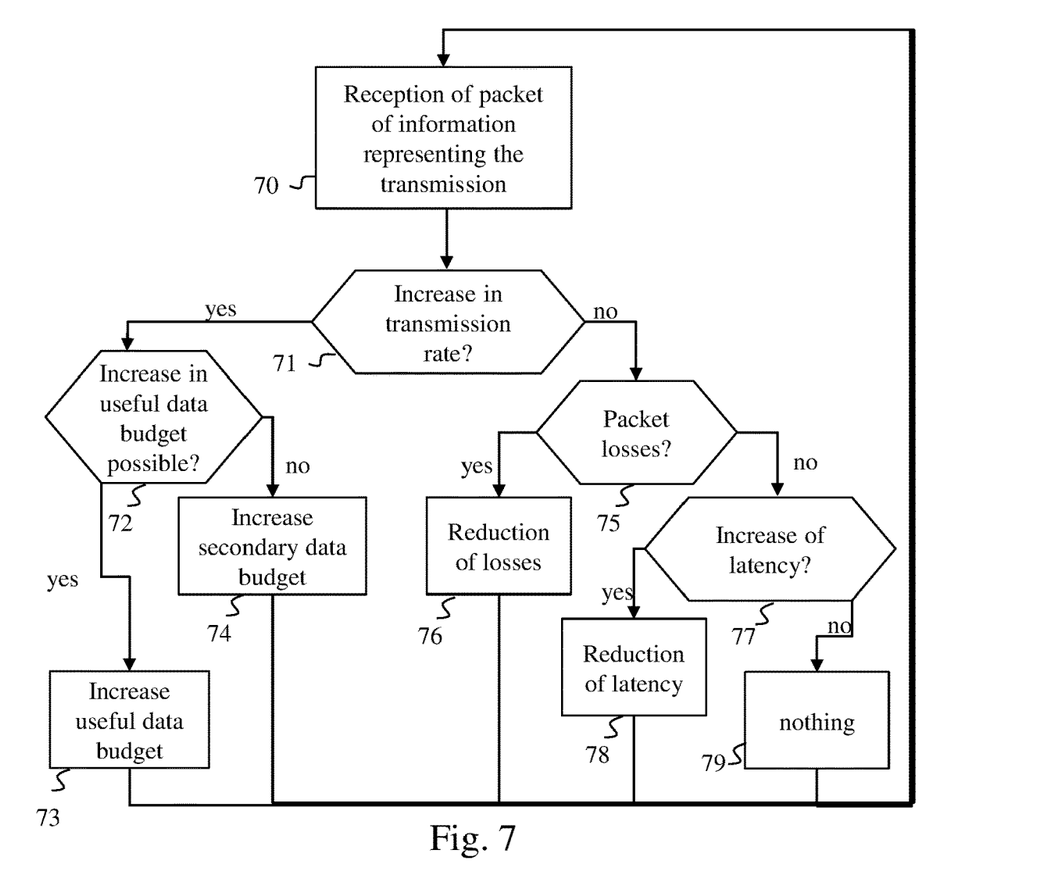
FIG. 7 illustrates schematically a link rate regulation method according to the invention.

FIG. 7 illustrates schematically the link rate regulation method according to the invention.

As stated above, the link rate regulation method is executed in parallel for each link in the plurality of links.

In a step 70, the processing module 12 receives a packet of information representing a transmission. Each reception of a packet of information representing a transmission causes initiation of the link rate regulation method. These packets are transmitted regularly to the control equipment 3 by the drone 1, for example every 5 ms.

In a step 71, the processing module 12 determines whether an increase in the transmission rate on the current link is possible. To do this the processing module 12 uses in particular the information contained in the packets of information representing the transmission.

From the information contained in the field "Total link loss" and the information "Ack end seq", the processing module 12 calculates a current loss rate $P_c$ on the link. The information "Ack end seq" represents the sequence number of the last packet acknowledged. By dividing the value of the field "Total link loss" by a difference between the last two values of the information "Ack end seq" received in packets of information representing the transmission, it is possible to determine the current loss rate $P_c$. From the current loss rate $P_c$ and a loss rate $P_{prev}$ preceding the current loss rate $P_c$, the processing module 12 calculates a loss rate increase value $\Delta_p = P_c - P_{prev}$.

From the current loss rate $P_c$ and a predefined loss rate preceding the current loss rate $P_c$, the processing module calculates a mean loss rate on the current link $\tilde{P}$.

From the information contained in the field "OWD", the processing module 12 obtains a current one-way delay $owd_c$ and calculates a difference $\Delta_{owd}$ between the current one-way delay $owd_c$ and a minimum value of the current one-way delay min_OWD. The minimum value of the current one-way delay min_OWD is calculated along with the transmission by taking the minimum value of the one-way delay observed.

From the information contained in the field "Total link received bytes", the processing module calculates the reception rate rx_bitrate of the control system 3 on the current link. Each packet comprises in its header a time indicator (not shown in tables 1 to 4). The rate rx_bitrate is calculated by dividing the value of the field "Total link received bytes" by a difference between the time indicator values of the last two packets of information representing the transmission. In one embodiment, this rate value rx_bitrate is filtered, for example by a second-order Butterworth filter, in order to attenuate any high variations in the rates $R_x$ calculated successively.

Following these calculations, the processing module 12 checks whether constraints in a predefined set of constraints are respected:

$\Delta_P < \varepsilon$;

$\tilde{P} < \varepsilon$;

$\Delta_{owd} < 3 \times \text{min\_OWD}$;

$owd_c < timewindow/2$;

$d(T_x)/dt - \varepsilon < d(\text{rx\_bitrate})/dt \le d(T_x)/dt + \varepsilon$;

where $\varepsilon$ is a small value for example equal to unity, $T_x$ is a transmission rate on the current link by the drone 1, $$\frac{d(T_x)}{dt}$$

is a first derivative or the variations in the transmission rate $T_x$ and $$\frac{d(R_x)}{dt}$$

is a first derivative or the variations in the reception rate $R_x$.

If each constraint in the predefined set of constraints is respected, the processing module 12 passes to a step 72. Otherwise the processing module 12 passes to a step 75.

Increasing a transmission rate is always risky when there is only an approximate knowledge of the bandwidth available on a network. The increase risks causing losses of useful data (audio/video data or the like). In order to limit the impact that an increase in rate can have on useful data, the transmission rate on a current link is shared between a rate budget of the useful data comprising the audio/video data, referred to as the useful budget, and a secondary-data rate budget, referred to as the secondary budget, not necessary for decoding the audio/video data. Only the secondary budget is increased during an increase in transmission rate. The secondary-data budget is increased in order to test the rate available on the network. Since the secondary data consist either of redundant data or stuffing data comprising for example a series of bits at 0 or a series of bits at 1, the loss thereof has no effect on the decoding of the useful data. The useful budget is increased only when no information representing the transmission received following an increase in the secondary budget indicates an increase in a risk of data losses (i.e. an increase in the packet loss rate or an increase in the one-way time).

During step 72, the processing module 12 determines which budget can be increased. To do this, the processing module 12 checks whether the secondary budget B_sec is less than a predefined percentage P70 of the transmission rate tx_bitrate. For example P70=15%. When B_sec>P70\*tx_bitrate, the processing module 12 determines that it is the useful budget that can be increased. The processing module 12 then increases the useful budget during a step 73. Otherwise the processing module 12 increases the secondary budget during a step 74. Steps 72, 73 and 74 are detailed in relation to FIGS. 8 and 9.

During step 75, the processing module 12 determines whether the current loss rate $P_c$ is greater than zero. If so, the processing module 12 executes a step 76 during which it applies a reduction in the transmission rate making it possible to reduce the loss rate on the link. Step 76 is detailed in relation to FIG. 10.

If the current loss rate $P_c$ is zero, the processing module 12 checks whether the latency is too great during a step 77.

If the latency is acceptable, the processing module 12 does nothing and waits during a step 79. Otherwise the processing module 12 applies a reduction in the transmission rate making it possible to reduce the one-way delay during a step 78. Steps 77, 78 and 79 are detailed in relation to FIG. 11.

Steps 73, 74, 76, 78 and 79 are followed by step 70.

It should be noted that, whereas the steps of increasing the transmission rate 73 and 74 may relate to the three rate regulation modes, the steps of reductions in the transmission rate relate only to the second rate regulation modes. Moreover, as soon as one of the constraints examined during step 71 is not satisfied, the processing module 12 irremediably leaves aggressive mode.

Figure 8:
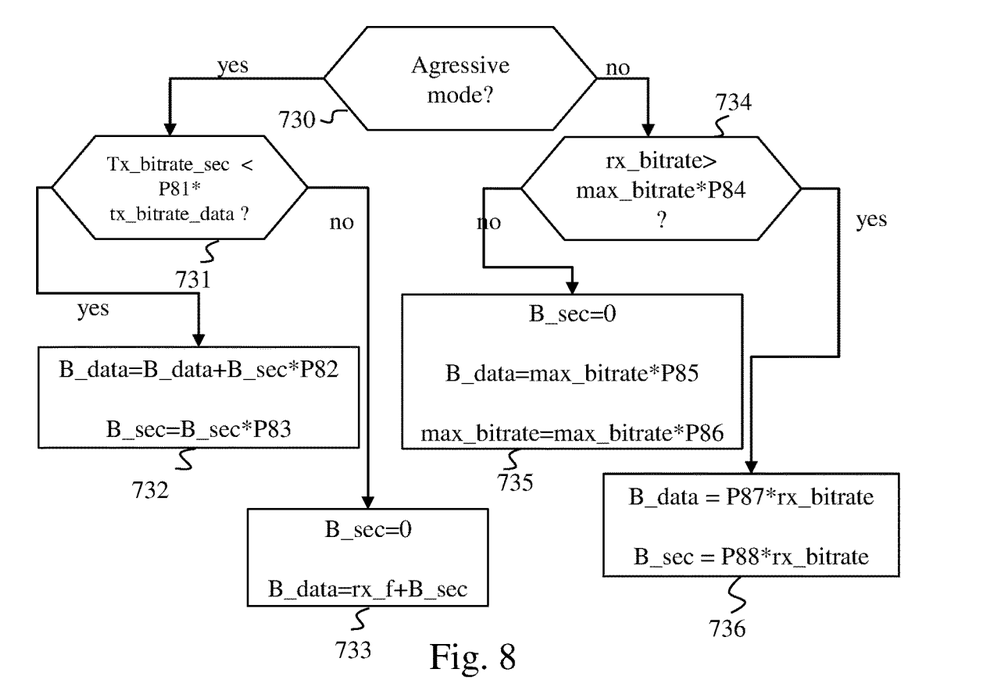
FIG. 8 illustrates schematically a first detail of the rate regulation method of a network link according to the invention.

FIG. 8 illustrates schematically a first detail of step 73 of the method for regulating the rate of a network link according to the invention.

In a step 730, the processing module 12 determines whether it is in aggressive mode. For this purpose it suffices for the processing module 12 to check that it has not noted any packet loss until then.

If the processing module 12 is in aggressive mode, it passes to step 731. Otherwise it executes step 734.

During step 731, the processing module 12 checks whether a secondary-data transmission rate tx_bitrate_sec is less than a first predefined percentage P81 of a useful-data transmission rate tx_bitrate_data. For example P81=15%.

If tx_bitrate_sec<P81\*tx_bitrate_data, during a step 732 the processing module 12 increases the useful budget B_data by a second predefined percentage P82 of the secondary budget B_sec (B_data=B_data+B_sec\*P82) and decreases the secondary budget B_sec by the value of the increase in the useful budget B_data (B_sec=B_sec\*P83). For example, P82=P83=50%.

If the transmission rate of the secondary data tx_bitrate_sec is not less than the first predefined percentage P81 of the useful data transmission rate tx_bitrate_data, during a step 733 the processing module 12 fixes the value of the useful budget B_data at the sum of the transmission budget rx_f and the secondary budget B_sec and sets the secondary budget B_sec to zero.

Steps 732 and 733 correspond to step 73 in the case of aggressive mode. It should be noted that, in these two steps, the total transmission budget (the sum of the useful budget B_data and secondary budget B_sec) has not changed. Only the sharing between useful budget B_data and secondary budget B_sec has been changed in order to increase the useful budget B_data. Thus the increase in the useful budget B_data has not caused an increase in the risk of packet losses. The increase in the secondary budget B_sec is intentionally limited so that the secondary data do not take an excessively large share in the transmitted data.

During step 734, the processing module 12 checks whether the rate Rx_bitrate of reception by the control system 3 reaches a third predefined percentage P84 of the maximum rate available on the network max_bitrate. For example, P84=50%. It is assumed here that the rate max_bitrate was obtained by the processing module 12 using the information contained in the field "Total link received bytes" of the packets of information representing the transmission.

When Rx_bitrate>max_bitrate\*P84, the processing module 12 allocates, during a step 736, respectively to the useful budget B_data and to the secondary budget B_sec, a fourth predefined percentage P87 and a fifth predefined percentage P88 of the reception rate rx_bitrate, a sum of the useful budget B_data and of the secondary budget B_sec being equal to said reception rate rx_bitrate, the useful budget B_data being greater than the second budget B_sec:

B_data=P87\*rx_bitrate

B_sec=P88\*rx_bitrate

B_data+B_sec=rx_bitrate

B_data>Bsec

In one embodiment, P87=90% and P88=10%. During step 736, taking percentages of the reception rate rx_bitrate, one is assured of remaining within the bandwidth limits of the current link.

When Rx_bitrate≤max_bitrate\*P84, during a step 735, the processing module 12 sets the secondary budget B_sec to zero and allocates to the useful budget B_data a predefined sixth percentage P85 of said maximum max_bitrate. Moreover, the processing module 12 reduces the maximum max_bitrate by a predefined seventh percentage P86. This is because the passage to step 735 means that, for an unknown reason, the transmission rate has dropped abruptly (or less probably has dropped gradually) so as to reach the value max_bitrate\*P84. Under these conditions, it is not certain that the previously achievable maximum transmission rate is still available. It is preferable to reduce this maximum in order to reduce the risks during re-increases of the transmission rate. In one embodiment, P85=50% and P86=10%. Thus, when it is observed that the reception rate rx_bitrate is very much less than the maximum rate max_bitrate (here the reception rate rx_bitrate is less than half the maximum rate max_bitrate), the transmission rate is increased directly to half the maximum rate max_bitrate. The increase can in this case therefore be rapid if the reception rate is very low, but secure since this is still very far from the maximum rate observed on the current link.

Steps 735 and 736 correspond to step 73 in the case of gentle mode or secure mode.

In gentle and secure modes, the secondary budget cannot exceed the predefined percentage P81 (here 15%) of the reception rate rx_bitrate.

It should be noted that, in steps 734, 735 and 736, account is taken of the information representing the transmission (rx_bitrate, max_bitrate) in order to determine the useful and secondary budgets whereas in steps 731, 732 and 733 this information was not used.

Figure 9:
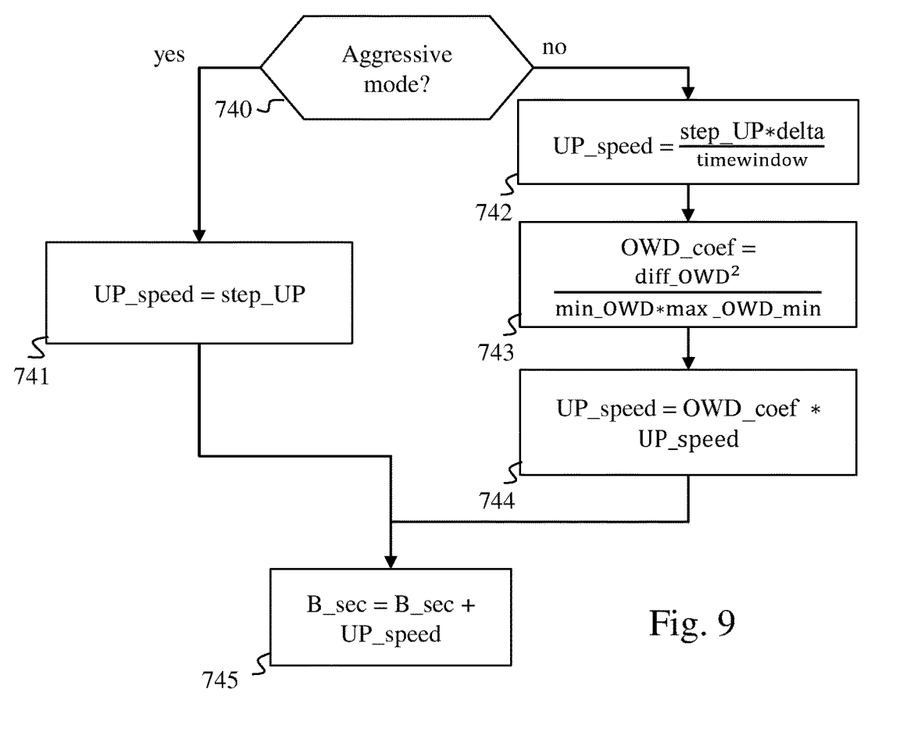
FIG. 9 illustrates schematically a second detail of the rate regulation method of a network link according to the invention.

FIG. 9 illustrates schematically a detail of step 74 of the method for regulating the rate of a network link according to the invention.

In a step 740, the processing module 12 determines whether it is in aggressive mode. If the processing module 12 is in aggressive mode, during a step 741 the processing module 12 obtains a predefined increase value step_UP and allocates this value to a variable UP_speed representing the increase in rate of the secondary budget B_sec. In a step 742, the processing module adds the value of the variable UP_speed to the secondary rate budget B_sec:

B_sec=B_sec+UP_speed;

The secondary budget therefore increases by the predefined increase value step_UP. In one embodiment, step_UP=100 bytes.

If the processing module 12 is not in aggressive mode, the value of the variable UP_speed is calculated in three steps 742, 743 and 744.

During step 742, the processing module 12 calculates an intermediate value of the variable UP_speed:

$$UP\_speed = \frac{step\_UP * delta}{timewindow}$$

where delta is a difference such that delta–timewindow–$owd_c$.

Figure 12:
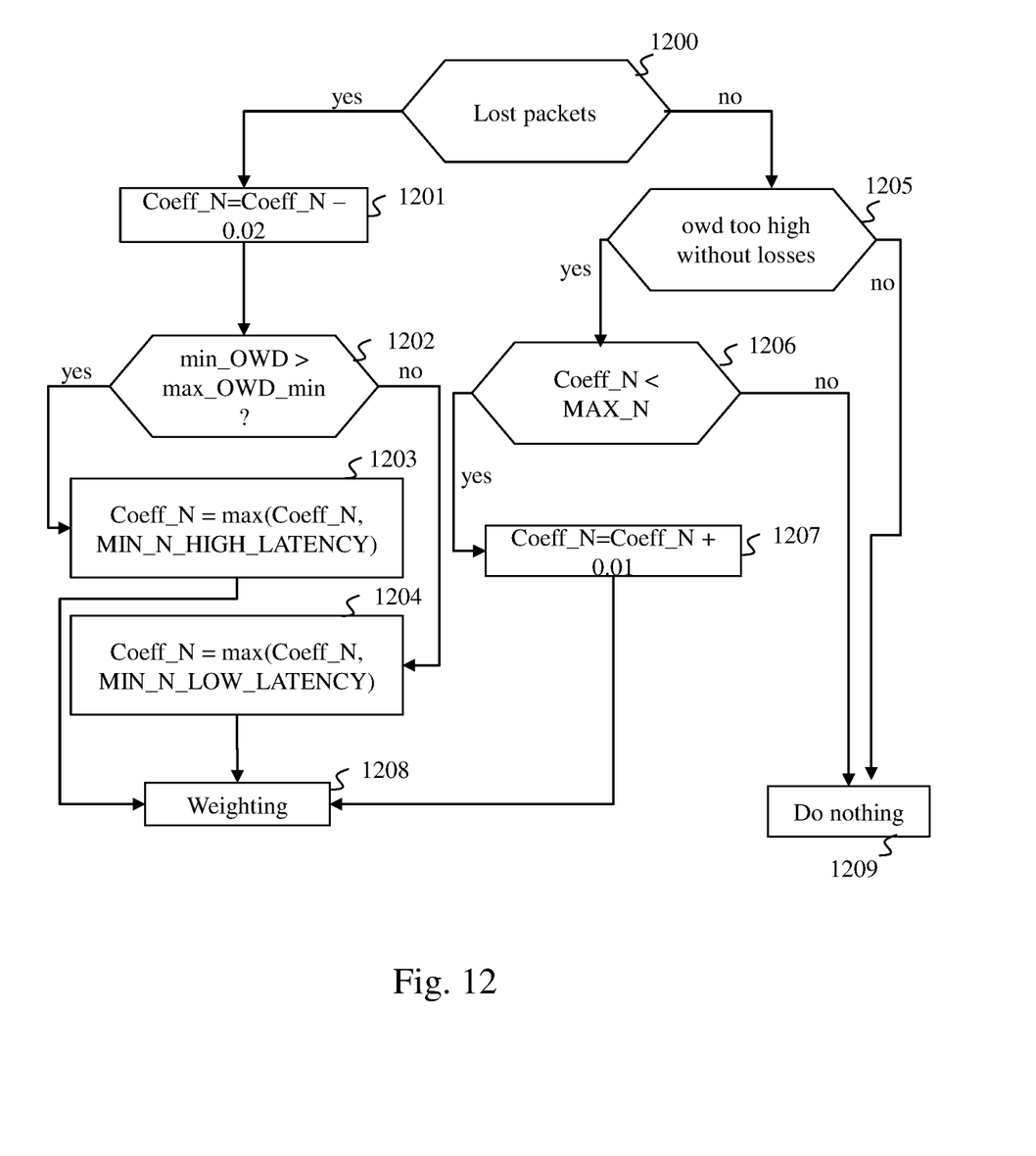
FIG. 12 describes a detail of a step of the method of FIG. 9.

During a step 743, the processing module 12 calculates a coefficient OWD_coef based on the one-way delay:

$$OWD\_coef = \frac{diff\_OWD^2}{min\_OWD * max\_OWD\_min}$$

where diff_OWD is a difference such that diff_OWD=Coef_N×(min_OWD−$owd_c$). Coef_N is a variable the calculation of which is explained below in relation to FIG. 12. max_OWD_min is a value used for distinguishing low-latency links from high-latency links. In one embodiment the value max_OWD_min is fixed at 200 ms and makes it possible to distinguish conventional links having latencies below 100 ms from satellite links for which latency is around 300 ms.

During a step 744, the value of the variable UP_speed is calculated:

UP_speed=OWD_coef*UP_speed

The difference delta being less than the duration timewindow, the intermediate value of the variable UP_speed is necessarily less than the predefined increase value step_UP. Likewise the numerator diff_OWD$^2$ is by definition less than the denominator min_OWD*max_OWD_min. The coefficient OWD_coef is therefore necessarily positive and less than unity. The value of the variable UP_speed in the case of gentle mode and secure mode is therefore less than the predefined increase value step_UP. The increases in the secondary budget B_sec in gentle mode and in secure mode are therefore less than the increases in the secondary budget B_sec in aggressive mode. Moreover, the more the one-way delay owd approaches the duration timewindow, the lower the increase in the secondary budget B_sec. In addition, the greater the difference diff_OWD, the smaller the increase in the secondary budget B_sec. Small rate increases reduce the risks of packet losses.

Step 744 is followed by step 745 already explained.

Figure 10:
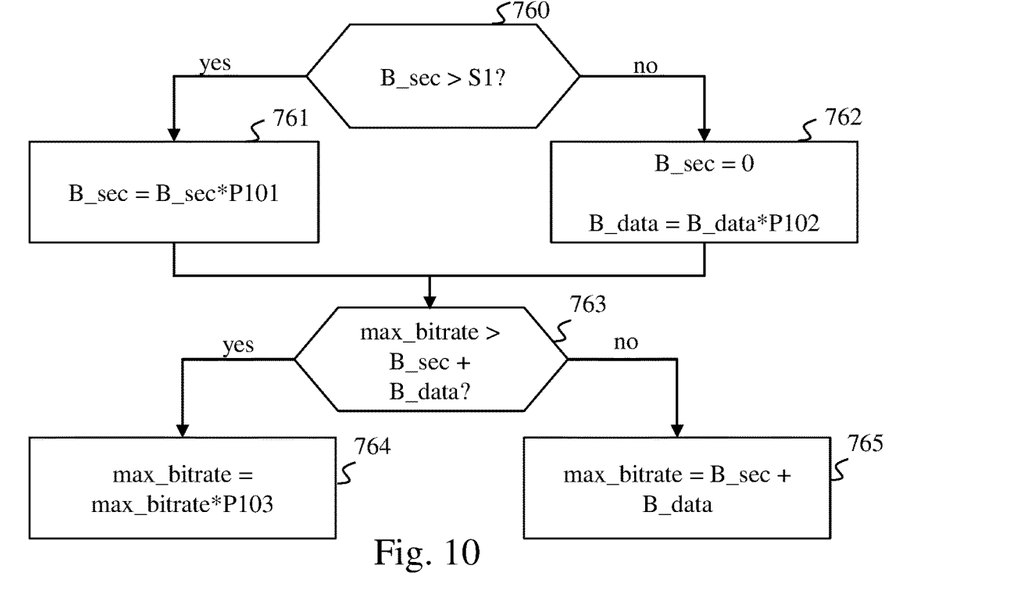
FIG. 10 illustrates schematically a third detail of the rate regulation method of a network link according to the invention.

FIG. 10 illustrates schematically a detail of step 76 of the method for regulating the rate of a network link according to the invention.

Step 76 corresponds to a case where packet losses have been noted. In a step 760, the processing module 12 checks whether it can reduce the secondary budget B_sec. For this purpose, the processing module 12 checks that the secondary budget B_sec is sufficiently high for a reduction in this budget to have an impact on the transmission. The secondary budget B_sec is therefore compared with a predefined minimum budget S1. In one embodiment S1=100 kbits/s. If the secondary budget B_sec is higher than the minimum budget S1, the processing module 12 executes a step 761. Otherwise it executes a step 762.

During step 761, the processing module 12 decreases the secondary budget B_sec by a predefined eighth percentage P10:

B_sec=B_sec*P101

In one embodiment P101=90%.

During step 762, the processing module 12 reduces the secondary rate B_sec to zero and decreases the useful budget B_data by a predefined ninth percentage P102.

B_data=B_data*P102

In one embodiment P102=90%.

The maximum available rate on the network max_bitrate is next updated during steps 763, 764 and 765.

During step 763, the processing module 12 checks whether the current transmission rate (i.e. whether the sum of the secondary budget B_sec and useful budget B_data) is higher than the rate max_bitrate.

If the rate max_bitrate is less than the current transmission rate, the processing module 12 fixes the value of the rate max_bitrate at the value of the current transmission rate during a step 765:

max_bitrate=B_sec+B_data

If the rate max_bitrate is higher than the current transmission rate, the processing module 12 reduces the value of the rate max_bitrate by a predefined tenth percentage P103:

max_bitrate=max_bitrate*P103

In one embodiment P103=90%.

In steps 763, 764 and 765, the fact that the maximum rate available on the network has had to decrease was therefore taken into account.

Figure 11:
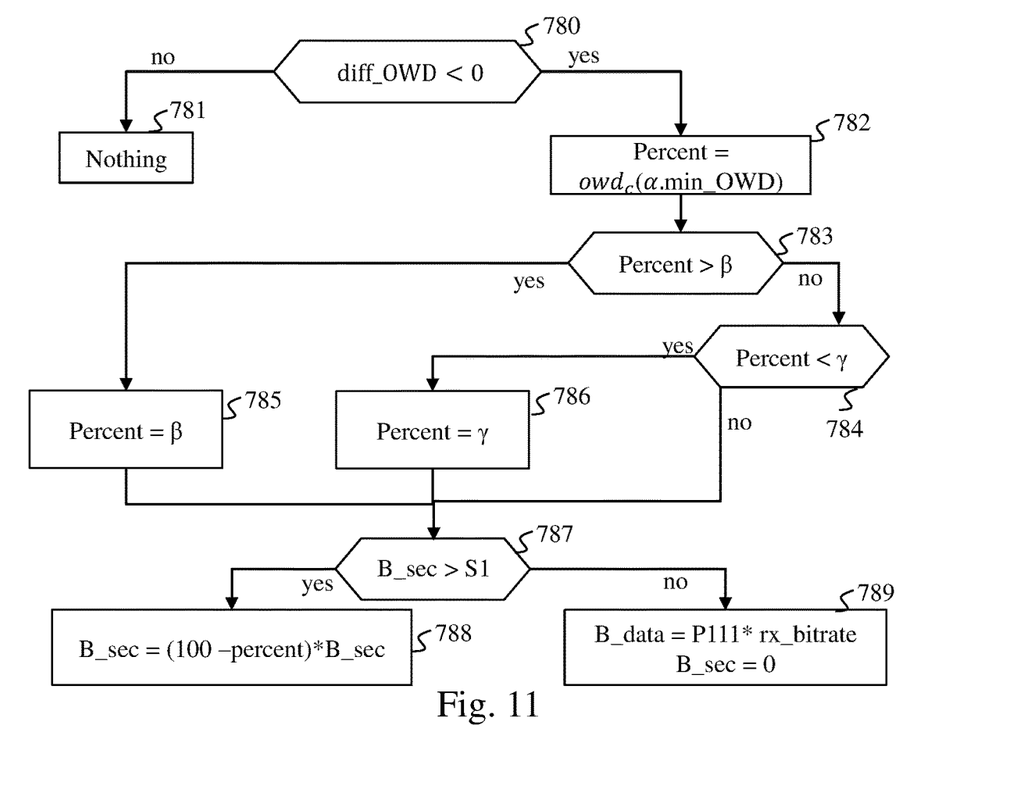
FIG. 11 illustrates schematically a fourth detail of the rate regulation method of a network link according to the invention.

FIG. 11 illustrates in detail steps 77, 78 and 79 of the method for regulating the rate of a network link according to the invention.

In a step 780, corresponding to step 77, the processing module 12 checks whether the latency is too great. For this purpose the processing module 12 determines whether the last difference diff_OWD calculated is less than zero.

If the difference diff_OWD is greater than or equal to zero, the processing module 12 implements a step 781 corresponding to step 79. During this step the processing module 12 does nothing and waits.

If the difference diff_OWD is less than zero, the processing module 12 implements steps 782 to 789 corresponding to step 78.

In a step 782, the processing module 12 calculates a variable Percent representing a percentage drop and such that Percent=$owd_c$·(α.min_OWD)

In one embodiment α=1.5.

In a step 783 the processing module 12 compares the variable Percent with a predefined value β. In one embodiment β=10.

If Percent>β, then Percent is fixed at the predefined value β. Thus the percentage drop Percent never exceeds the predefined value β (here 10%). The predefined value β is therefore the maximum percentage drop.

If Percent<β, the processing module 12 compares the variable Percent with a predefined value γ. In one embodiment γ=5. If Percent<γ, then Percent is fixed at the predefined value γ. Thus the percentage drop Percent is never less than the predefined value of γ (here 5%). The predefined value γ is therefore the minimum percentage drop.

Steps 784, when the variable Percent is between the predefined value γ and the predefined value β, 785 and 786 are followed by a step 787.

During step 787, the processing module 12 compares the secondary budget B_sec with a predefined minimum secondary budget value S1. Below the predefined minimum secondary budget S1, the secondary rate budget B_sec is considered to be insignificant. It is preferable in this case to return it to zero. In one embodiment S1=100 kbits/s.

If B_sec>S1, the secondary rate budget B_sec is decreased as follows:

B_sec=(100−Percent)×B_sec/100

If B_sec≤S1, the secondary budget B_sec is set to zero, and the useful budget B_data is decreased as follows:

$$B\_data = P111 \times rx\_bitrate$$

where P111 is a predefined eleventh percentage P111. In one embodiment P111=90%

Steps 73, 74, 76, 78 and 79 are followed by step 70 as soon as a packet of information representing the transmission by the processing module 12 is received.

FIG. 5 illustrates schematically a method for regulating the global rate according to the invention allowing a distribution of data over a plurality of network links.

The global rate regulation method uses results of various instances of the link rate regulation method in order to distribute the packets over the network links 2A, 2B and 2C. The global rate regulation method is executed periodically with a predefined period that can be fixed for example at a value between 2 and 10 ms.

In a step 50, the processing module 12 checks whether data are to be transmitted to the control system 3. For example, it checks a state of an output memory (buffer) of the audio/video encoder 101 or whether secondary data are to be transmitted. During step 50, the processing module also checks whether sufficient budget is available on at least one of the network links 2A, 2B or 2C to transmit the data that it has to transmit. To do this, the processing module adds the useful budget B_data and the secondary budget B_sec for each link 2A, 2B and 2C.

If no data are to be transmitted or if no link has a sufficient budget, the processing module 12 waits.

Otherwise the processing module 12, during a step 51, obtains information representing the network link that it is to use. In one embodiment, the network links are classified in an ordered list. The processing module 12 runs through this list in the order of the list. During step 51, the processing module 12 uses the network link following the last network link used in the list. If the last network link used is the last in the list, the processing module 12 resumes the list at the beginning. The link chosen during step 51 is called the selected link.

In a step 52, the processing module 12 obtains a data packet to be transmitted.

In a step 53, the processing module 12 checks that the budget of the link selected is sufficient to transmit said data packet. If it is a useful data packet, the processing module 12 checks that the useful budget B_data of the selected link is sufficient. If it is a packet of secondary data, the processing module 12 checks that the secondary budget B_sec of the selected link is sufficient.

If the budget is not sufficient, the processing module 12 returns to step 51 in order to pass to the next network link in the list.

Otherwise, in a step 54, the processing module 12 supplies said packet to the communication module corresponding to the network link selected and causes the sending of the packet by said communication module.

In a step 55, the processing module 12 updates the audio/video data transmission rate and if necessary the transmission rate of the redundant data of the forward error control and of the retransmissions using information on the data previously transmitted over the network links. This makes it possible to determine what percentage of the transmitted data represents the audio/video data. This percentage can then be used to calculate a rate constraint to be allocated to the audio/video encoder 101 (by applying said percentage to the sum of the useful budgets obtained for each link). The bitrate of the redundant data of the forward error control and/or of the retransmissions depends directly on the audio/video rate and cannot be modified.

In a step 56, the processing module 12 checks that data remain to be transmitted following the sending of the packet during step 54. If data remain to be transmitted, the processing module 12 returns to step 52. Otherwise the processing module returns to step 50 and awaits new data to be transmitted.

In one embodiment, the network links are ordered in the list according to information representing performances of each network link. At regular intervals, for example whenever a packet of information representing the transmission is received or every T seconds, with for example T=1 s, the processing module 12 calculates a performance metric $Q_i$ for each link (with i=2A, 2B or 2C).

$$Q_i = \frac{(B\_data_i + B\_sec_i)^2}{(P_c^i)^2 \times TD} \times \left(\frac{timewindow}{3} - owd_c^i\right)$$

where $B_{data_i}$ is the useful budget for the link i, $B_{sec_i}$ is the secondary budget for the link i, $P_c^i$ is the current packet loss rate for the link i, TD is a secondary budget sum for all the links (TD=$\Sigma_{i=2A,2B,2C} B_{sec_i}$), and $owd_c^i$ is the last one-way delay measured for the network link i.

It should be noted that, the higher the transmission rate budget of a network link ($B_{data_i}+B_{sec_i}$), the higher the performance metric of this link. In addition, the lower the packet loss rate on a network link $P_c^i$, the higher the performance metric of this link. Finally, the lower the one-way delay compared with the size of the congestion window, the higher the performance metric of this link. The links having a high rate budget, a low packet loss rate and a low one-way delay are therefore situated at the head of the list. The performance metric $Q_i$ is therefore an increasing function of the budget for data to be transmitted by the link i ($B_{data_i}+B_{sec_i}$), a decreasing function of information representing a packet loss rate on the link i (here $P_c^i$ but this could just as well be an average packet loss rate), and an increasing function of a difference between the duration timewindow and information representing a one-way time measured for the link i $$\left(\frac{timewindow}{3} - owd_c^i\right).$$

It should be noted that, in this metric, by taking the square of the transmission rate budget and of the packet loss rate, greater importance is given to these two items of information representing the network than to the one-way delay. Giving more importance to the transmission rate budget and to the loss rate than to latency makes it possible to avoid unnecessarily penalising links for which a high latency is normal, such as satellite links. The links with a high latency but without losses will also be privileged compared with the networks with losses having a lower latency.

In one embodiment, when the list is ordered according to the performance metric $Q_i$ and, during step 56, the processing module 12 is without data to be transmitted immediately after a packet transmission, the next link used for transmitting a packet is the first in the list. The list is next run through starting from the first link in the list. In this way the sending of data over the links having the best performance metric (i.e. the best links) is privileged.

FIG. 12 describes a detail of step 743 and more particularly a method for computing the variable Coef_N.

The method described in relation to FIG. 12 is executed periodically with a predefined period δ by the processing module 12. In one embodiment, the method is executed every 10 seconds (δ=10 seconds). During the period δ preceding an execution of the method, the processing module 12 evaluates the number of losses as well as a number of times that the one-way delay exceeds a value Coeff_N*min_OWD without packet losses being noted.

In a step 1200, the processing module 12 determines whether losses have been noted during the period δ preceding the current execution of the method for determining the variable Coeff_N.

If losses have been noted, in a step 1201 Coeff_N is decreased by 0.02.

In a step 1202, the processing module 12 checks whether the link is a link with low latency or high latency. To do this, the processing module compares min_OWD with max_OWD_min. If min_OWD>max_OWD_min, the processing module 12 determines that the link is a high-latency link. In this case, it executes a step 1203. Otherwise it executes a step 1204.

In step 1203, the processing module 12 calculates a value of the variable Coeff_N by taking the maximum between the value of Coeff_N calculated during step 1201 and a minimum value of Coeff_N adapted to the high-latency link MIN_N_HIGH_LATENCY.

In step 1204, the processing module 12 calculates a value of the variable Coeff_N by taking the maximum between the value of Coeff_N calculated during step 1201 and a minimum value of Coeff_N adapted to the high-latency link MIN_N_HIGH_LATENCY.

Steps 1203 and 1204 are followed by a step 1208 during which the value of the variable Coeff_N is weighted. In one embodiment, the value of coeff_N calculated by weighting during step 1208 results from a weighted average of the last four values of the variable coeff_N calculated, the last value calculated having the highest weight in the weighted average.

If no packet loss has been noted during step 1200, the processing module 12 checks, during a step 1205, how many times the one-way delay has exceeded the value Coeff_N*min_OWD during the previous period δ without packet losses being noted. If the one-way delay has exceeded a predefined number of times $K_{owd}$ (for example $K_{owd}$=5) the value Coeff_N*min_OWD without packet losses being noted, the processing module 12 executes a step 1206. Otherwise the processing module 12 decides not to change the value of the variable Coeff_N during a step 1209.

During step 1206, the processing module 12 checks whether the value of the variable Coeff_N is less than a predefined maximum value MAX_N of the value Coeff_N. If so, the value of the variable Coeff_N is incremented by 0.01. Otherwise the processing module 12 executes step 1209 already explained.

Step 1207 is followed by step 1208.

Step 1208 is however optional and the processing module 12 could also use the value of the variable Coeff_N resulting from steps 1203, 1204 and 1207.

In one embodiment:
MIN_N_HIGH_LATENCY=1.5
MIN_N_LOW_LATENCY=2.5
MAX_N=4.

The invention claimed is:

1. A method for regulating transmission rate during a transmission of audio/video data over a network link between a sender and a receiver, said method being implemented during receptions by the sender of information representing the transmission transmitted by the receiver, wherein the method is implemented by the sender and comprises:

a plurality of transmission rate regulation modes comprising a first transmission rate regulation mode, executed at the start of the transmission, wherein the only possible modification to the transmission rate by the sender is an increase, in determining each rate increase value no account being taken of any information representing the transmission, and at least one second regulation mode implemented following the first mode, wherein at least one of the items of information representing the transmission is used to increase or decrease the transmission rate, a change from the first mode to a second mode taking place when one of the items of information representing the transmission indicates that the transmission rate has reached a maximum rate available on said network link;

said transmission rate being shared between a useful-data rate budget comprising the audio/video data, referred to as the useful budget, and a secondary-data rate budget, referred to as the secondary budget, not necessary for the decoding of the audio/video data, only the secondary budget is increased during an increase in the transmission rate, the useful budget being increased only when no information representing the transmission received following an increase in the secondary budget indicates an increase in risk of data loss.

2. The method according to claim 1, wherein, in the first mode, when at least one of the items of information representing the transmission indicates that an increase in a useful budget is possible, the method comprises:

increasing the useful budget by a second predefined percentage of the secondary budget when a rate of transmission by the sender of secondary data is lower than a first predefined percentage of the rate of transmission by the sender of the useful data, and decreasing the secondary budget by the value of the increase in the useful budget; increasing the useful budget by fixing the value of the useful budget at the sum of the secondary budget and a value representing a rate of reception by the receiver of the useful and secondary data transmitted by the sender.

3. The method according to claim 1, wherein, in the first mode, when at least one of the items of information representing the transmission indicates that an increase in a secondary budget must be applied, the method comprises:

increasing the secondary budget by a first predefined increase value.

4. The method according to claim 1, wherein, in a second mode, where at least one of the items of information representing the transmission indicates that an increase in the useful budget is possible, the method comprises:

when one of the items of information representing the transmission indicates that a reception rate of the receiver reaches a third predefined percentage of the maximum rate available on the network, allocating respectively to the useful budget and to the secondary budget predefined fourth and fifth percentages of the reception rate, a sum of the useful budget and secondary budget being equal to said reception rate, the useful budget being greater than the secondary budget;

when one of the items of information representing the transmission indicates that said reception rate is lower than the third predefined percentage of the maximum rate available on the network, setting the secondary budget to zero, allocating to the useful budget a sixth predefined percentage of said maximum and decreasing said maximum by a seventh predefined percentage.

5. The method according to claim 1, wherein, in a second mode, when at least one of the items of information representing the transmission indicates that an increase in the secondary budget must be applied, the method comprises:
calculating an increase value by multiplying a second predefined increase value lower than the first predefined increase value by a coefficient lying between zero and unity, said coefficient being calculated from an item of information representing a time window and information dependent on one-way times observed by the receiver and transmitted in the information representing the transmission to the sender; and
increasing the useful budget by the calculated increase value.

6. The method according to claim 1, wherein, when at least one of the items of information representing the transmission indicates that no increase in the transmission rate is possible, the method comprises:
applying a procedure for checking the packet loss rate and reducing the transmission rate if the loss rate is higher than a predefined loss threshold;
if the loss rate is lower than the predefined loss threshold, applying a procedure for checking the one-way delay and reducing the transmission rate when a difference between the one-way delay and a reference one-way delay value is greater than a predefined difference.

7. A method for regulating transmission rate between a sender and receiver connected by a plurality of network links during transmission of audio/video data, the method comprises:
forming a list of ordered links;
running through the links in the order of the list;
for each link:
defining a budget for data to be transmitted by said link, referred to as a current link, using information supplied for the current link by the rate regulation method according to claim 1; and
transmitting a quantity of data corresponding to said budget;
passing to the next link when the quantity of data corresponding to said budget has been transmitted, resuming the list at the start when all the links in the list have been run through.

8. The method according to claim 7, wherein the list is ordered in accordance with a performance metric calculated for each link in the plurality of links, for a link, said metric being an increasing function of the budget for data to be transmitted by said link, a decreasing function of an item of information representing a packet loss rate on said link, and an increasing function of a difference between a congestion window size of the links and an item of information representing a one-way time measured for said link.

9. The method according to claim 8, wherein the performance metric for a network link i in the plurality of links is calculated as follows:

$$Q_i = \frac{(B\_data_i + B\_sec_i)^2}{(P_c^i)^2 \times TD} \times \left(\frac{timewindow}{3} - owd_i\right)$$

where $B_{data_i}$ is the useful budget for the network link i, $B_{sec_i}$ is the secondary budget for the network link i, the sum of said useful budget and of said secondary budget being the budget for data to be transmitted by the network link i, $P_c^i$ is information representing a packet data loss for the network link i, TD is a secondary budget sum for all the network links in said plurality, timewindow is a maximum acceptable latency between the sender and the receiver, and $owd_i$ is the information representing a one-way delay measured for the network link i.

10. The method according to claim 8, wherein, when the sender is without data to be transmitted after a transmission of a packet, the next link used for transmitting a packet is the first in the list, the list next being run through starting from the first link in the list.

11. A device for regulating transmission rate during a transmission of audio/video data of a network link between a sender and receiver, characterised in that it comprises means suitable for implementing the method according to claim 1.

12. A device for regulating transmission rate between a sender and a receiver connected by a plurality of network links during a transmission of audio/video data, characterised in that it comprises means suitable for implementing the method according to claim 7.

13. Audio/video data transmission system comprising a sender comprising a device according to claim 11 and a receiver, the sender and receiver being connected by at least one network link.

14. A non-transitory information storage medium that stores a computer program comprising program code instructions that, when executed by a programmable device, causes said programmable device to implement the method according to claim 1.

* * * * *